(12) United States Patent
Heath et al.

(10) Patent No.: US 11,821,120 B2
(45) Date of Patent: Nov. 21, 2023

(54) MULTI-LAYER NEEDLED NONWOVEN ARTICLE AND METHODS OF MANUFACTURE THEREOF

(71) Applicant: Auria Solutions UK I, Ltd., London (GB)

(72) Inventors: Tyler Madison Heath, Mount Gilead, NC (US); Rodney Gene Dyer, Troy, NC (US); Timothy Joel Allison, Marion, NC (US)

(73) Assignee: AURIA SOLUTIONS UK I LTD., London (GB)

( * ) Notice: Subject to any disclaimer, the term of this patent is extended or adjusted under 35 U.S.C. 154(b) by 82 days.

(21) Appl. No.: 17/118,131

(22) Filed: Dec. 10, 2020

(65) Prior Publication Data

US 2021/0170717 A1 Jun. 10, 2021

Related U.S. Application Data

(60) Provisional application No. 62/946,121, filed on Dec. 10, 2019.

(51) Int. Cl.
*D04H 1/46* (2012.01)
*D04H 1/498* (2012.01)
*B32B 5/06* (2006.01)
*B32B 5/02* (2006.01)
(Continued)

(52) U.S. Cl.
CPC ............... *D04H 1/46* (2013.01); *B32B 5/022* (2013.01); *B32B 5/06* (2013.01); *B32B 5/24* (2013.01);
(Continued)

(58) Field of Classification Search
CPC ........ D04H 1/46; D04H 1/498; D04H 13/005; D04H 5/02; D04H 3/102; D04H 3/105;
(Continued)

(56) References Cited

U.S. PATENT DOCUMENTS 3,241,214 A * 3/1966 Smith ...................... H05B 3/34
28/112
3,245,854 A * 4/1966 Etchison .................. D04H 1/54
28/112
(Continued)

FOREIGN PATENT DOCUMENTS

| CN | 101680144 A | 3/2010 | |
| GB | 2172546 A * | 9/1986 | ........... A41D 15/005 |
| WO | WO-03076046 A2 * | 9/2003 | ......... B01D 39/1623 |

OTHER PUBLICATIONS

International Search Report and Written Opinion of International Application No. PCT/US2020/64298, dated Mar. 4, 2021, 10 pages.
(Continued)

*Primary Examiner* — Amy Vanatta
(74) *Attorney, Agent, or Firm* — Grossman, Tucker, Perreault & Pfleger, PLLC; Steven J. Grossman

(57) ABSTRACT

A method of forming a multi-layer needled non-woven article, comprising forming a web of a fiber base layer, an intermediate film and a fiber top layer, wherein the intermediate film is disposed between the fiber base layer and the fiber top layer; needle punching the web with a plurality of needles; and wherein, during needle punching, fibers of the fiber base layer are carried by the needles, extended through perforations in the intermediate film formed by the needles and entangled with fibers of the fiber top layer.

13 Claims, 8 Drawing Sheets

(51) Int. Cl.
  *B32B 5/24* (2006.01)
  *B32B 27/12* (2006.01)
  *D04H 13/00* (2006.01)

(52) U.S. Cl.
  CPC ............. *B32B 27/12* (2013.01); *D04H 1/498* (2013.01); *D04H 13/005* (2013.01); *B32B 2307/718* (2013.01); *B32B 2307/732* (2013.01); *B32B 2471/02* (2013.01); *B32B 2605/003* (2013.01)

(58) Field of Classification Search
  CPC ........ D04H 3/10; D04H 18/02; D04H 1/4291; D04H 1/4374; D04H 1/485; D04H 1/488; B32B 5/06; B32B 5/022; B32B 5/24; B32B 27/12; B32B 27/281; B32B 2262/0261; B32B 2262/0284; B32B 2307/718; B32B 2307/732; B32B 2471/02; B32B 2605/003; B32B 5/08; B32B 27/08; B32B 2250/05; B32B 27/36; B32B 2250/40; B32B 2260/021; B32B 2262/062; B32B 2262/14; B32B 27/40; B32B 2250/03; B32B 2260/046; B32B 27/32; B32B 2262/0253; B32B 2262/0269; B32B 2262/04; B32B 2270/00; B32B 2274/00; B32B 2307/102; B32B 7/12; B32B 27/34; B32B 5/02
  USPC .................................................. 28/107–115
  See application file for complete search history.

(56) References Cited

U.S. PATENT DOCUMENTS

| | | | | |
|---|---|---|---|---|
| 3,284,872 A | * | 11/1966 | Closson, Jr. | ......... D04H 1/4258 28/112 |
| 3,400,188 A | * | 9/1968 | Olson | .................... D04H 13/02 264/156 |
| 3,428,506 A | * | 2/1969 | Johnstone | .............. B01D 39/04 156/250 |
| 3,485,705 A | * | 12/1969 | Harmon | .................. D04H 13/00 428/113 |
| 3,637,102 A | | 1/1972 | Shaw | |
| 4,199,635 A | * | 4/1980 | Parker | ....................... B32B 5/26 442/388 |
| 5,208,098 A | | 5/1993 | Stover | |
| 5,470,326 A | * | 11/1995 | Dabi | .................. A61F 13/53713 604/383 |
| 5,547,731 A | * | 8/1996 | Tesch | ....................... D04H 1/46 428/95 |
| 5,945,358 A | | 8/1999 | Marchand | |
| 7,156,937 B2 | * | 1/2007 | Provost | .............. A44B 18/0011 156/72 |
| 8,025,751 B2 | * | 9/2011 | Zafiroglu | .................. D04H 1/60 28/112 |
| 2002/0055006 A1 | | 5/2002 | Vogel et al. | |
| 2006/0228963 A1 | * | 10/2006 | Souther | ................... B32B 27/34 442/364 |
| 2008/0223654 A1 | * | 9/2008 | Juriga | ....................... B32B 5/26 428/221 |
| 2011/0151231 A1 | | 6/2011 | Chomarat | |
| 2016/0207279 A1 | | 7/2016 | Ichikawa et al. | |
| 2018/0014678 A1 | * | 1/2018 | Zafiroglu | ................ B32B 27/36 |
| 2018/0142387 A1 | * | 5/2018 | Wang | ..................... B32B 5/028 |

OTHER PUBLICATIONS

Second Office Action of Chinese Patent Application No. 202080048310.X and English Translation, dated Sep. 29, 2023, 20 pages.

* cited by examiner

MULTI-LAYER NEEDLED NONWOVEN ARTICLE AND METHODS OF MANUFACTURE THEREOF

CROSS-REFERENCE TO RELATED APPLICATIONS

This application claims the benefit of U.S. provisional application Ser. No. 62/946,121 filed Dec. 10, 2019, which is hereby incorporated by reference.

FIELD

The present disclosure relates to a multi-layer needled non-woven article, and more particularly a multi-layer needled non-woven acoustic article, such as a dilour carpet for the interior trim flooring of a motor vehicle.

SUMMARY

The present disclosure provides a multi-layer needled non-woven article, and more particularly a multi-layer needled non-woven acoustic article, which may be used to improve acoustic behavior in a motor vehicle. The present disclosure provides an alternative approach to needle a multi-layer non-woven automotive trim article together. The process involves needling through a fibrous substrate to a fibrous cover to mechanically connect the fibrous substrate and the fibrous cover together, while perforating a film disposed between the fibrous substrate and the fibrous cover. The fiber deposited in the perforations, and a torturous path created through the film layer, act to improve the sound absorption and insertion loss of the non-woven article.

In at least one embodiment, a method of forming a multi-layer needled non-woven article is provided, which comprises forming a web of a fiber base layer, an intermediate film and a fiber top layer, wherein the intermediate film is disposed between the fiber base layer and the fiber top layer; needle punching the web with a plurality of needles; and wherein, during needle punching, fibers of the fiber base layer are carried by the needles, extended through perforations in the intermediate film formed by the needles and entangled with fibers of the fiber top layer.

In at least one embodiment, the method comprises at least partially closing the perforations in the intermediate film formed by the needles as the needles withdraw therefrom.

In at least one embodiment, the method comprises inhibiting at least a portion of the fibers of the fiber base layer extending through the perforations in the intermediate film from returning to the fiber base layer by the at least partial closing of the perforations in the intermediate film formed by the needles.

In at least one embodiment, the intermediate film has opposite sides; one side of the opposite sides of the intermediate film is in contact with the fiber base layer; and another side of the opposite sides of the intermediate film is in contact with the fiber top layer.

In at least one embodiment, the fiber base layer has an area weight in a range of 120 grams/square meter to 2,000 grams/square meter; the fiber base layer has a denier in a range of 0.5 denier to 40 denier; and the fiber base layer has fiber lengths in a range of 10 mm to 100 mm.

In at least one embodiment, the fibers of the fiber base layer are formed of thermoplastic.

In at least one embodiment, the fibers of the fiber base layer comprise staple fibers and binder fibers.

In at least one embodiment, the fiber base layer is a felt layer.

In at least one embodiment, the intermediate film has an area weight in a range of 10 grams/square meter to 900 grams/square meter; and the intermediate film has a thickness in a range of 0.0125 mm to 1 mm.

In at least one embodiment, the intermediate film is formed of thermoplastic.

In at least one embodiment, the intermediate film is a multi-layer film.

In at least one embodiment, the intermediate film has a middle layer, two tie layers and two outer layers; and the middle layer is disposed between the two tie layers, and the two tie layers are each disposed between the middle layer and one of the two outer layers, respectively.

In at least one embodiment, the intermediate film is a five-layer film having a polyamide middle layer, two tie layers and two polyethylene outer layers; and the polyamide middle layer is disposed between the two tie layers, and the two tie layers are each disposed between the polyamide middle layer and one of the two polyethylene outer layers, respectively.

In at least one embodiment, the fiber top layer has an area weight in a range of 120 grams/square meter to 1,200 grams/square meter; the fiber top layer has a denier in a range of 0.5 denier to 40 denier; and the fiber top layer has fiber lengths in a range of 10 mm to 100 mm.

In at least one embodiment, the fibers of the fiber top layer are formed of thermoplastic.

In at least one embodiment, the fibers of the fiber top layer comprise staple fibers and binder fibers.

In at least one embodiment, the fiber top layer is flat, or is structured with a random velour, loop pattern or random fiber pattern.

In at least one embodiment, a multi-layered needled non-woven article is provided, which comprises a fiber base layer, an intermediate film and a fiber top layer, wherein the intermediate film is disposed between the fiber base layer and the fiber top layer; and wherein needled fibers of the fiber base layer extend through needle-formed perforations in the intermediate film and entangle with fibers of the fiber top layer.

In at least one embodiment, the article is a carpet.

In at least one embodiment, the article is an automotive article.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1A:
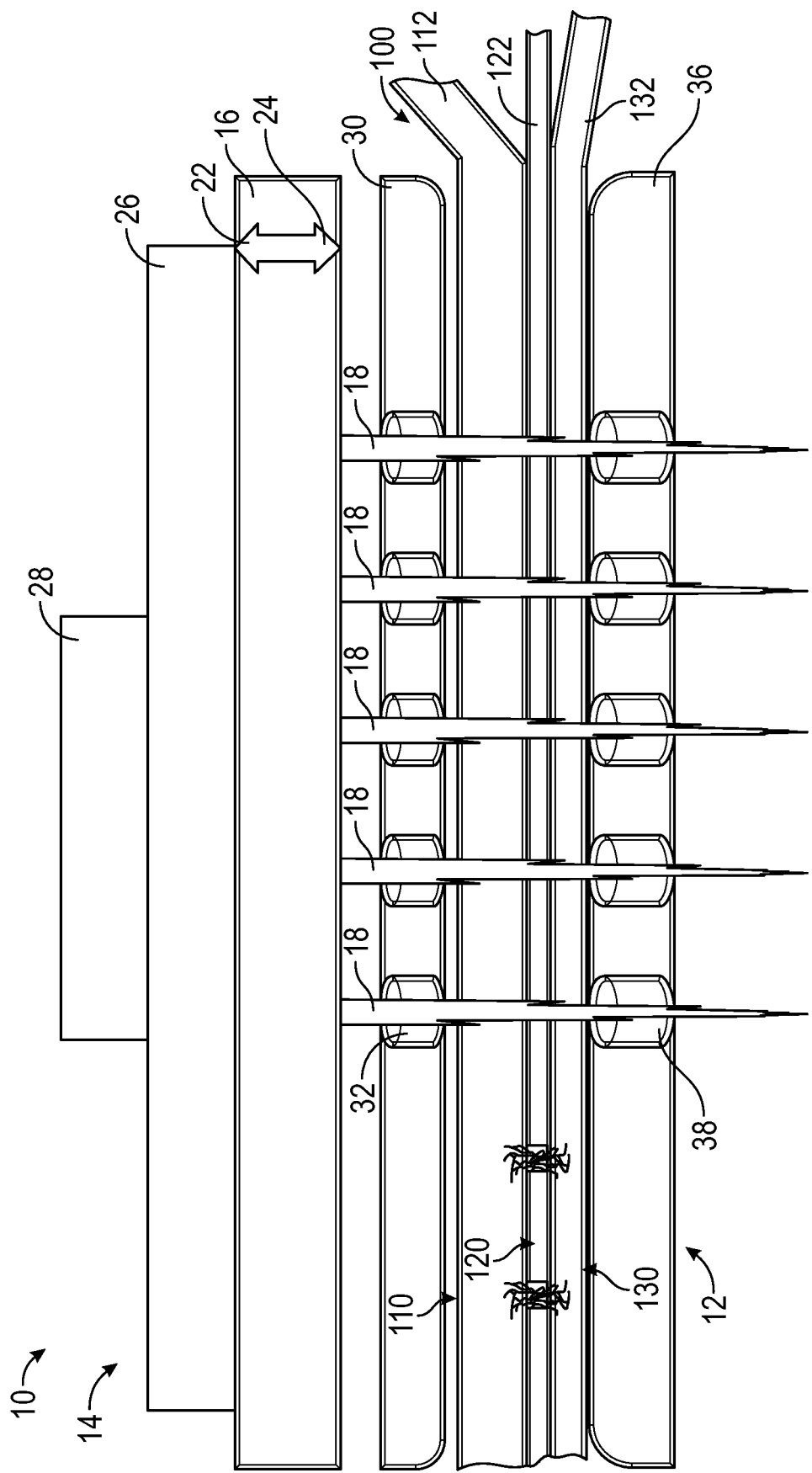
FIG. 1A is a side view of a needle punching apparatus and a multi-layer needled non-woven article according to the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Figure 1B:
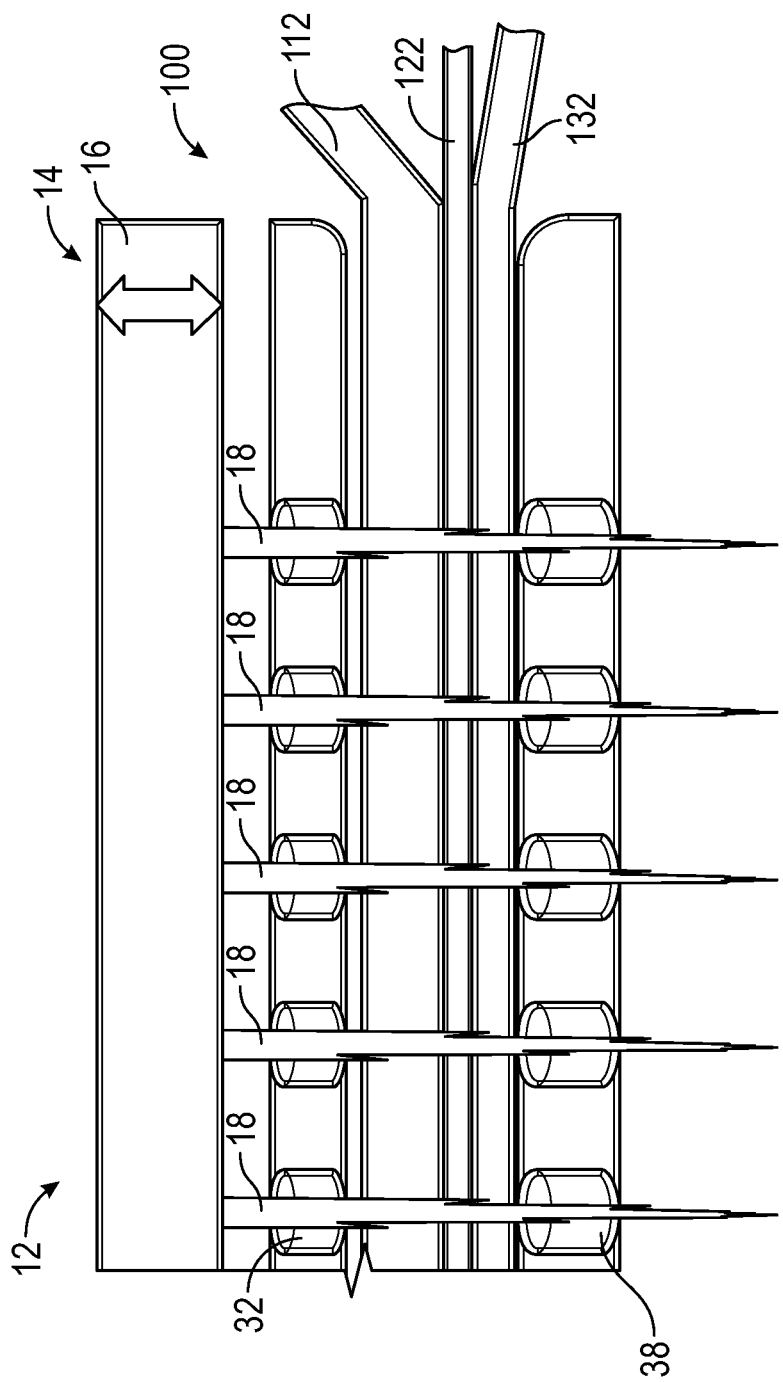
FIG. 1B is a close-up side view of the needle punching apparatus and the multi-layer needled non-woven article of FIG. 1A.
Figure 1C:
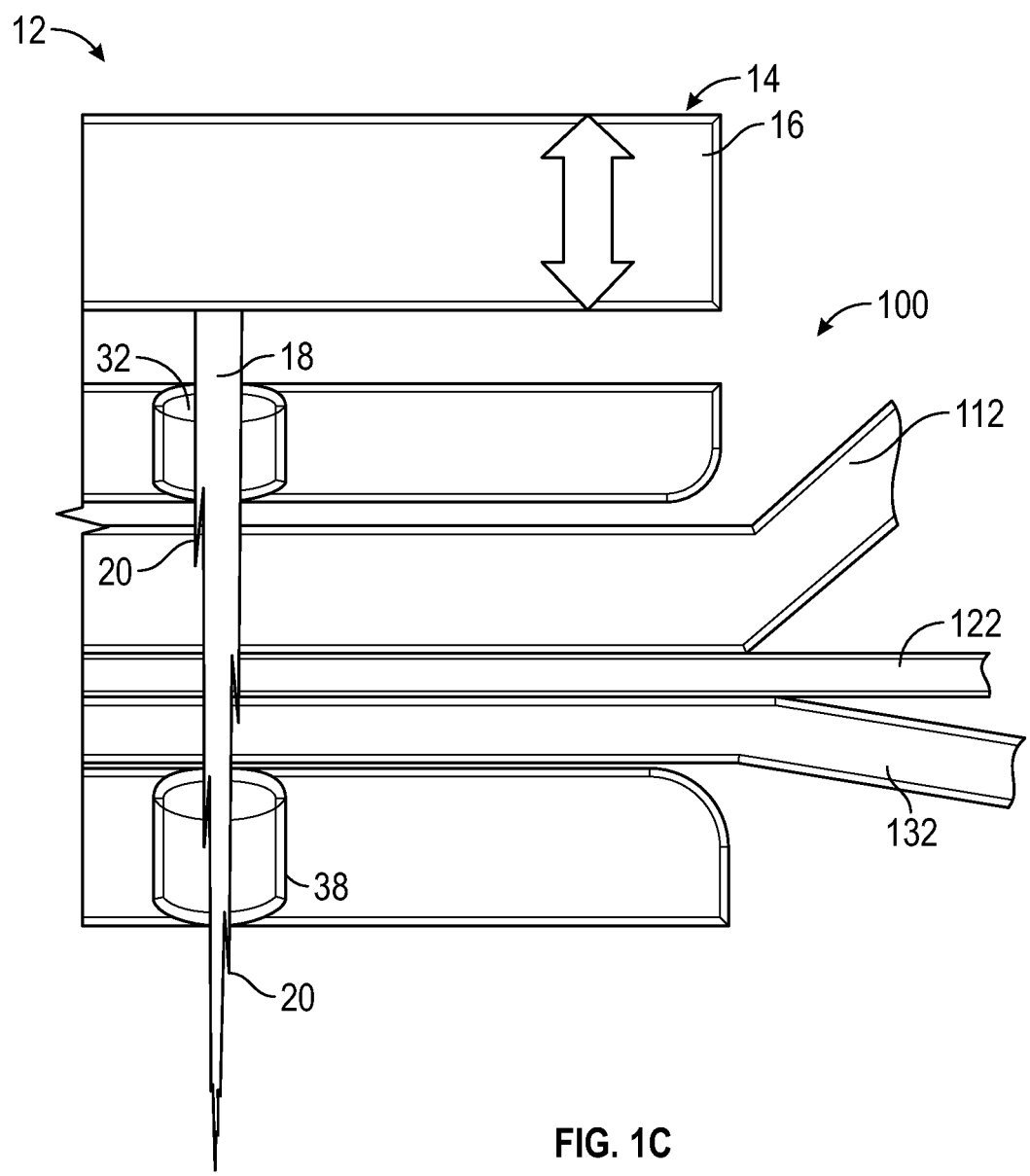
FIG. 1C is a further close-up side view of the needle punching apparatus and the multi-layer needled non-woven article of FIG. 1B.

Referring now to FIG. 1A-1C, there is shown a forming apparatus, particularly in a form of a needle punch apparatus 10 to form a multi-layer needled non-woven article 100 according to the present disclosure.

Needle punch apparatus 10 comprises a needle loom 12. Needle loom 12 comprises a needle board 14 having a needle board plate 16 and a plurality of needles 18 (e.g. non-woven structuring/finishing needles) extending vertically therefrom. The needle board 14 may be disposed on a needle beam 26 which holds the needle board 14 in place. The needle beam 26 is then mounted to a needle loom driver 28, by which the needle beam 26, including the needle board 12, is made movable in in upward vertical direction 22 and downward vertical direction 24 by a needle loom driver 28.

As shown the needles 18 are barbed needles having a plurality of barbs 20 (FIG. 1C) disposed along their longitudinal length. Needles 18 may more particularly be non-woven felting needles. The felting needles 18 may have a working gage in a range of 12-46 gage with a length in a range of 2.5 inches to 5 inches. More particularly, the felting needles 18 may have a working gage of 32-40 gage with a length in a range of 3 inches to 3.5 inches. The felting needles 18 may have various barb shapes and spacings depending on product type and application. The felting needles 18 may have point characteristics including: sharp very slightly rounded, slightly rounded, rounded, very rounded, or chisel point. The felting needles 18 may utilize various surface coatings and treatments to aid in product appearance. With regards to cross-sectional shape, the felting needles 18 may have, for example, a triangular cross-section, a four-star cross-section, a conical cross-section, twisted cross-section or a teardrop cross-section. Exemplary felting needles 18 may include needles sold under the trademarks GEBECON, CROSS STAR, TRI STAR, ECO-STAR of Groz-Beckert KG of Germany. Exemplary felting needles 18 are disclosed in U.S. publication and patent nos. 2019/0301066; 2010/0251526, 2010/0251525; 2007/0143975; and U.S. Pat. No. 6,233,787, which are incorporated by reference.

The needle punch apparatus 10 further comprises a stripper plate 30 and a bed plate 36, which are part of the needle loom 12.

Multi-layer needled non-woven article 100 is a composite formed of a fibrous substrate 110 (structured side of article 100), an intermediate film 120 and a fibrous cover 130 (non-structured side of article 100). Multi-layer needled non-woven article 100 may more particularly be a multi-layer needled non-woven carpet (e.g. dilour carpet) which also preferably functions to improve sound absorption (absorption of sound energy by the multi-layered needled non-woven herein) and insertion losses (reduction in noise level at a given location due to the multi-layer needled non-woven article herein). Multi-layer needled non-woven article 100 may therefore be particularly utilized in automotive motor vehicle applications such as for interior trim, interior flooring, headliners and trunk/storage space liners.

Fibrous substrate 110 provides at least one fiber base (bottom) layer 112, while intermediate film 120 provides at least one film intermediate layer 122 and fibrous cover 130 provides at least one fiber top (outer décor or face) layer 132. As shown, non-woven article 100 has three layers, 112/122/132.

While the fiber base layer 112 is shown overlying the fiber top layer 132 in the needle punch apparatus 10, it should be understood that the fiber top layer 132 and the fiber base layer 112 are referred to as such with regards to use of the non-woven article 100 and how it may be ordinarily perceived when viewed, for example, in an a motor vehicle, in which case the fiber top layer 132 is the outer décor layer which may be viewed by a vehicle occupant and the fiber base layer 112 underlies the fiber top layer 132.

Fiber base layer 112 may more particularly be a felt layer. The fibers may be formed of any material capable of producing a fiber based felt. The fiber base layer 112, and more particularly the felt layer, may be a single fiber layer (i.e. all fibers formed of a same composition or a multi-fiber layer (i.e. fibers formed of different compositions).

For example, the fibers may be formed of thermoplastic. The thermoplastic may comprise, or be selected from the group consisting of, polyethylene terephthalate (PET), polypropylene (PP), polyamide (PA), polyethylene terephthalate glycol (PETG) and mixtures thereof. The individual fibers may have all have the same composition, being formed of one or more thermoplastic compositions, or the individual fibers may have different thermoplastic compositions, again by being formed of one or more thermoplastic compositions. The fibers are preferably selected and configured to provide the desirable acoustic performance attributes noted herein. Non-limiting examples of such fibers for the base layer may include those identified above as well as recycled fibers, such as recycled thermoplastic fibers, cotton, rayon, nylon, viscose, and/or aramid fibers.

The fiber base layer 112, and more particularly the felt layer, may have an area weight in a range of 120 grams/m$^2$ to 2,000 grams/m$^2$ (i.e. square meter), and more particularly in a range of 400 grams/m$^2$ to 900 grams/m$^2$.

The fiber base layer 112, and more particularly the felt layer, may have a denier in a range of 0.5 denier to 40 denier, and more particularly in a range of 3 denier to 15 denier. The base layer 112 may comprise fiber lengths in a range of 10 mm to 100 mm, and more particularly in a range of 38 mm and 75 mm. Exemplary applications may be a mixture of denier size and staple lengths that are blended to achieve a desired level of tortuosity, appearance, stiffness, and formability. Generally, base layer 112 will contain a binder fiber that melts during a heating process and bonds the individual fibers together after cooling. Binder fibers may comprise bicomponent polyester fibers, polypropylene fibers, polyethylene fibers, polyamide fibers, or other melt fibers capable of bonding the base layer fiber matrix together after the heating and cooling process.

Film intermediate layer 122 may be a polymer film formed of any thermoplastic or thermoset composition, or combination thereof, capable of producing a film.

The film intermediate layer 112 may be a single layer film, or a multi-layer film. A single layer film may be formed of thermoplastic, inclusive of thermoplastic elastomers (TPE). The thermoplastic may comprise, or be selected from the group consisting of polyethylene terephthalate (PET), polypropylene (PP), polyamide (PA), polyethylene (PE) (inclusive of high density polyethylene (HDPE), linear low density polyethylene (LLDPE) medium density polyethylene (MDPE)) and polyurethane (PU) (such as thermoplastic urethane (TPU)), and mixtures thereof. The thermoplastic may be un-crosslinked or partially cross-linked as known in the art.

A multi-layer film may comprise at least two layers. A five-layer film may be formed of PE/tie layer/PA/tie layer/PE, thus having two outer polyethylene (PE) layers joined to an intermediate polyamide (PA) layer view two tie layers, respectively. A nine-layer film may be formed of PE/tie layer/PA/tie layer/PE/tie layer/PA/tie layer/PE.

The film intermediate layer 122 may have a thickness in a range of 0.0125 mm to 1 mm, and more particularly in a range of 0.025 mm to 1 mm and even more particularly in a range of 0.025 mm to 0.5 mm. The film intermediate layer 122 may have an area weight of 10 grams/m$^2$ to 900 grams/m$^2$, and more particularly in a range of 40 grams/m$^2$ to 100 grams/m$^2$. The film intermediate layer 122 may comprise between 1 and 9 layers, and be continuous (without being pre-perforated).

Fiber top layer 132 may be any structured or non-structured layer. For example, the fiber top layer 132 may be flat (no structuring), or have a random (delour) velour, loop pattern or random fiber pattern. The fibers may preferably be formed of any material capable of providing an automotive grade A textile surface. The fiber top layer 132 may be a single fiber layer (i.e. all fibers formed of a same composition or a multi-fiber layer (i.e. fibers formed of different compositions). The fibers may also be selected such that they do not provide an automotive grade A textile surface, but which are still selected and configured to provide the desirable acoustic performance attributes noted herein.

For example, the fibers may be formed of thermoplastic. The thermoplastic may comprise, or be selected from the group consisting of, polyethylene terephthalate (PET), polypropylene (PP), polyamide (PA), polyethylene terephthalate glycol (PETG), co-polyethylene terephthalate (CoPET) and mixtures thereof. The individual fibers may have all have the same composition, being formed of one or more thermoplastic compositions, or the individual fibers may have different thermoplastic compositions, again by being formed of one or more thermoplastic compositions (e.g. bi-component fibers having a core and a sheath formed of two different thermoplastics having different melt temperatures).

As noted above, the fibers for the fiber top layer are preferably selected to provide an automotive grade A textile surface, but may more generally be selected from fibers that do not provide a grade A textile surface, but still provide the desirable acoustic performance herein. Non-limiting examples of such fibers may include those identified above which do not necessarily provide an automotive grade A textile surface, and which may include for example recycled fibers, such as recycled thermoplastic fibers, as well as cotton, rayon, nylon, viscose, and/or aramid fibers.

The fiber top layer 132 may have an area weight in a range of 120 grams/m$^2$ to 1,200 grams/m$^2$, and more particularly in a range of 300 grams/m$^2$ to 650 grams/m$^2$.

The fiber top layer 132 may have a denier in a range of 0.5 denier to 40 denier, and more particularly in a range of 3 denier to 15 denier. The top layer 132 may comprise a blend of fibers including staple fibers and binder fibers. Staple fiber length for the top layer 132 may be in a range of 10 mm to 100 mm. The top layer 132 can be a blend of multiple deniers and staple lengths. Binder fibers including polyethylene (PE), polyethylene terephthalate (PET), polypropylene (PP), polyamide (PA), polyethylene terephthalate glycol (PETG) and other thermoplastic or thermosets can be added to the top layer 132 to bond the staple fibers together after heating and cooling. Percent binder fiber in the top layer 132 may be in a range of 10% to 40%, and more particularly in a range of 15% to 25%. Top layer 132 may comprise various fiber cross sections to include flat, round, oval, trilobal, and any other fiber shape commonly used to produce needled non-woven face materials.

Additionally, the multi-layer needled non-woven article 100 may have an acoustic impedance in a range of 500 to 3,000 Rayl (pascal second per meter).

During operation of the needle punch apparatus 10 the base layer 112, the intermediate layer 122 and the top layer 132 may all be taken off individual feed rolls and transported in the shown layered disposition on a carrier into the needle loom 12. Various types of needle looms may be used to produced this type product. Finishing looms, pre-needle looms, random velour looms, and others. The needle loom must simply penetrate the needle through the base layer 112, perforate the intermediate layer 122, and entangle fiber into the top layer 132. Prior to needle punching, the base layer 112, the intermediate layer 122 and the top layer 132 may be referred to collectively as a web. After needle punching in the needle loom 12, the resultant needled non-woven article 100 may be taken up on an exit (take up) roll.

During needle punching, the needle punched non-woven article 100 is created by mechanically connecting, particularly by interlocking, the fibers of the fiber base layer 112 and the fiber top layer 132 through the film intermediate layer 122. The mechanical interlocking is achieved with barbed needles 18 repeatedly passing into and out of the three-layer web 112/122/132.

As shown, the stripper plate 30 is disposed on top of the web 112/122/132, and the bed plate 36 is disposed beneath the web 112/122/132. As shown, corresponding through-holes 32 and 38 (FIG. 1B) are disposed in the stripper plate 30 and the bed plate 36, respectively, through which the needles 18 extend in and out with reciprocating motion.

Figure 2:
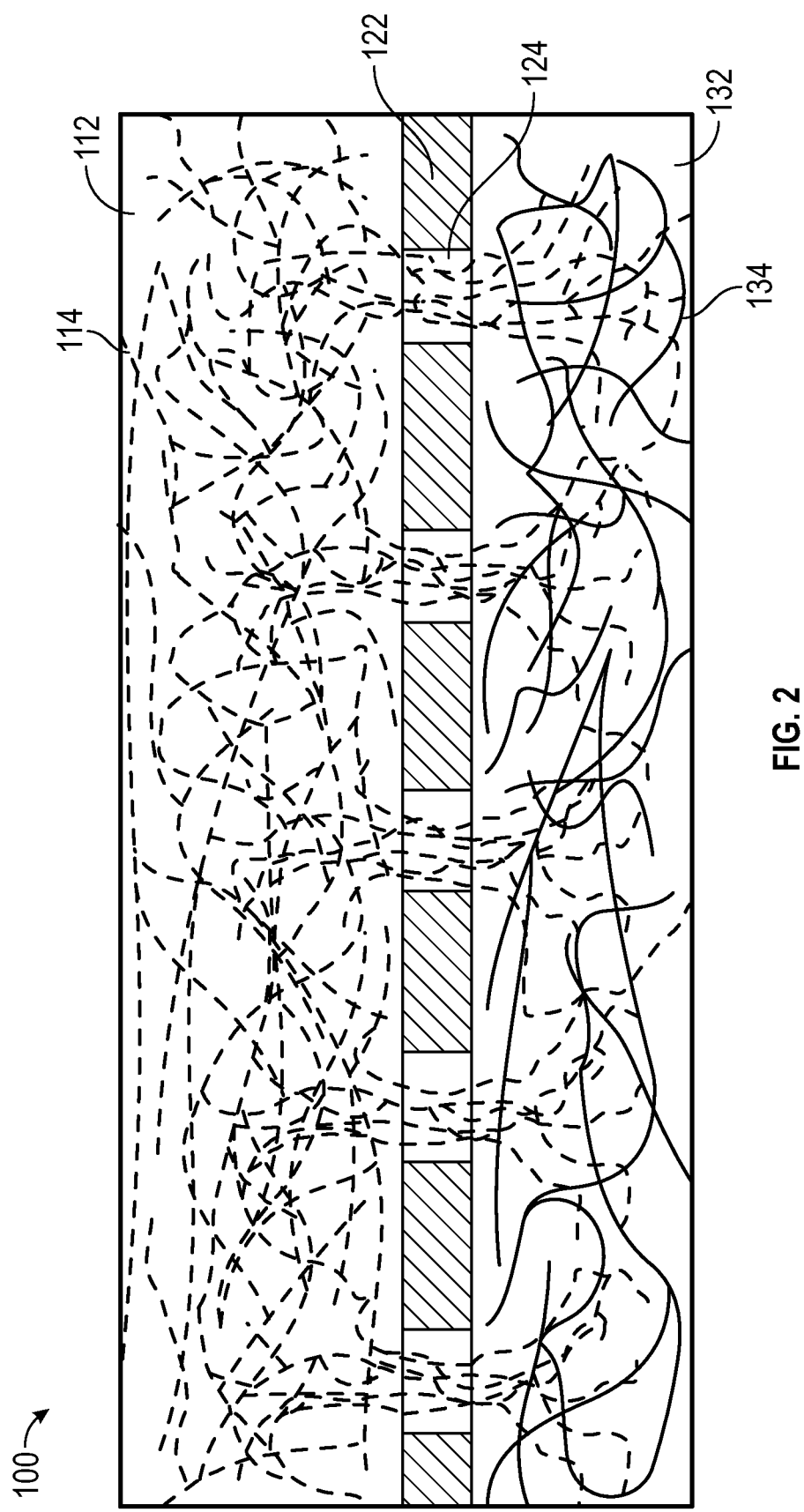
FIG. 2 is a close-up side view of the multi-layer needled non-woven article of FIG. 1A.

Referring to FIG. 2, the needles 18 engage and carry bundles of fibers 114 (dashed lines) from the base layer 112 on the downward stroke in the downward direction 24 which then become entangled with the fibers 134 (solid lines) of the top layer 132. The entangled fibers 114, 134 may extend into the bed plate holes 38 when the needles 18 are in there most downward position. On the upward stroke in the upward direction 22, the stripper plate 30 then strips the fibers 114, 134 from the needles 18 so the web 112/122/132 can advance through the needle loom 12.

More particularly, as the needle loom beam 26 moves in the downward direction 24, the barbs 20 of the needles 18 (1) pick up and carry fibers 114 from the base layer 112, (2) perforate the film intermediate layer 122 forming perforations 124 in the intermediate layer 122, and (3) then carry and push the fibers 114 through the perforations 124 in the intermediate layer 122 to a depth of penetration into the top layer 132, in which case the drawn fibers 114 are reoriented from a substantially horizontal orientation/position to a substantially vertical orientation/position transverse to the horizontal orientation as they extend through the perforations 124.

It may be appreciated that, use of the film intermediate layer 122 may increase the strength of the mechanical connection between the base layer 112 and the top layer 132 resulting from the needle punching. It may be understood that, when the needles 18 travel out of the top layer 132, at least some of the fibers 114 of the base layer 112 may exit the top layer 132 and travel back to the base layer 112, rather than becoming entangled with the fibers 134 of the top layer. However, without being bound to a particular theory, when the fibers 114 of the base layer 112 extend through the perforations 124 of the intermediate layer 122 and into the top layer 132 while being carried by the needles 18, the longitudinal length of the fibers 114 may be orientated with the longitudinal length of the needles 18. Then, as the needles 18 travel out of the top layer 132 in the reverse direction, the perforations 124 occupied by the needles 18 may at least partially close (due to the resilience and elastic memory of the polymer material forming the film intermediate layer 122), thus trapping and inhibiting a larger portion of the fibers 114 from exiting the top layer 132 back to the base layer 114.

The puncture density, i.e. the number of needle punches on the surface of the web 112/122/132 per unit area and the penetration depth are factors with regards to the needled article 100 resisting separation of the layers 112/122/132, with the greater the number of needles 18 and the greater the depth of penetration (and hence entanglement) increasing retention strength. Puncture density may be in a range of 50 punches/cm$^2$ to 300 punches/cm$^2$, and more particularly in a range of 100 punches/cm$^2$ to 200 punches/cm$^2$.

It may also be appreciated that the use of the film intermediate layer 122 may increase the favorable appearance of the top layer 132 of the non-woven article 100 after needle punching. For example, current technologies for needle punching a base layer 112 to a dilour top layer 132 are known to have faced issues with face and pile distortion. However, use of the film intermediate layer 122 does not appear to suffer from the same such distortions. The needled composite dilour material, maintains an acceptable comparable pile height, pile strength, and overall pleasing appearance to the original (prior to being needle processed as disclosed) dilour face layer 132.

It may also be appreciated that the selection of the construction for the fiber base layer 112, film intermediate layer 122 and fiber top layer 132, as well as the forming process thereof, have an effect on the acoustic properties of the non-woven article 100. For example, the construction for the non-woven article 100 and the process of manufacture may be tuned to provide improvements in sound absorption and sound insertion loss.

Figure 3:
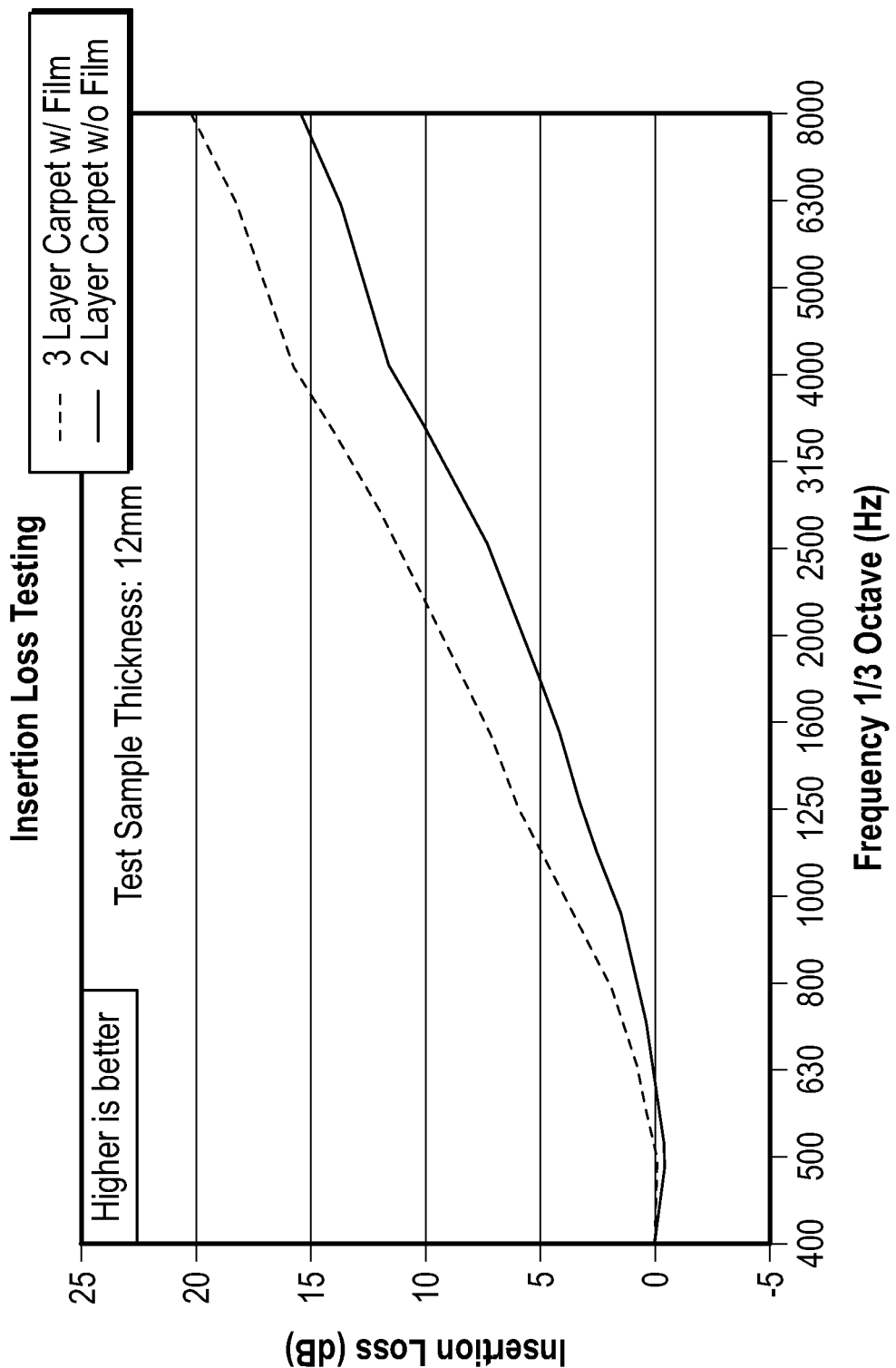
FIG. 3 shows sound inserting loss testing of a 3 layer carpet with film herein versus a 2 layer carpet without film at a thickness of 12 mm.
Figure 4:
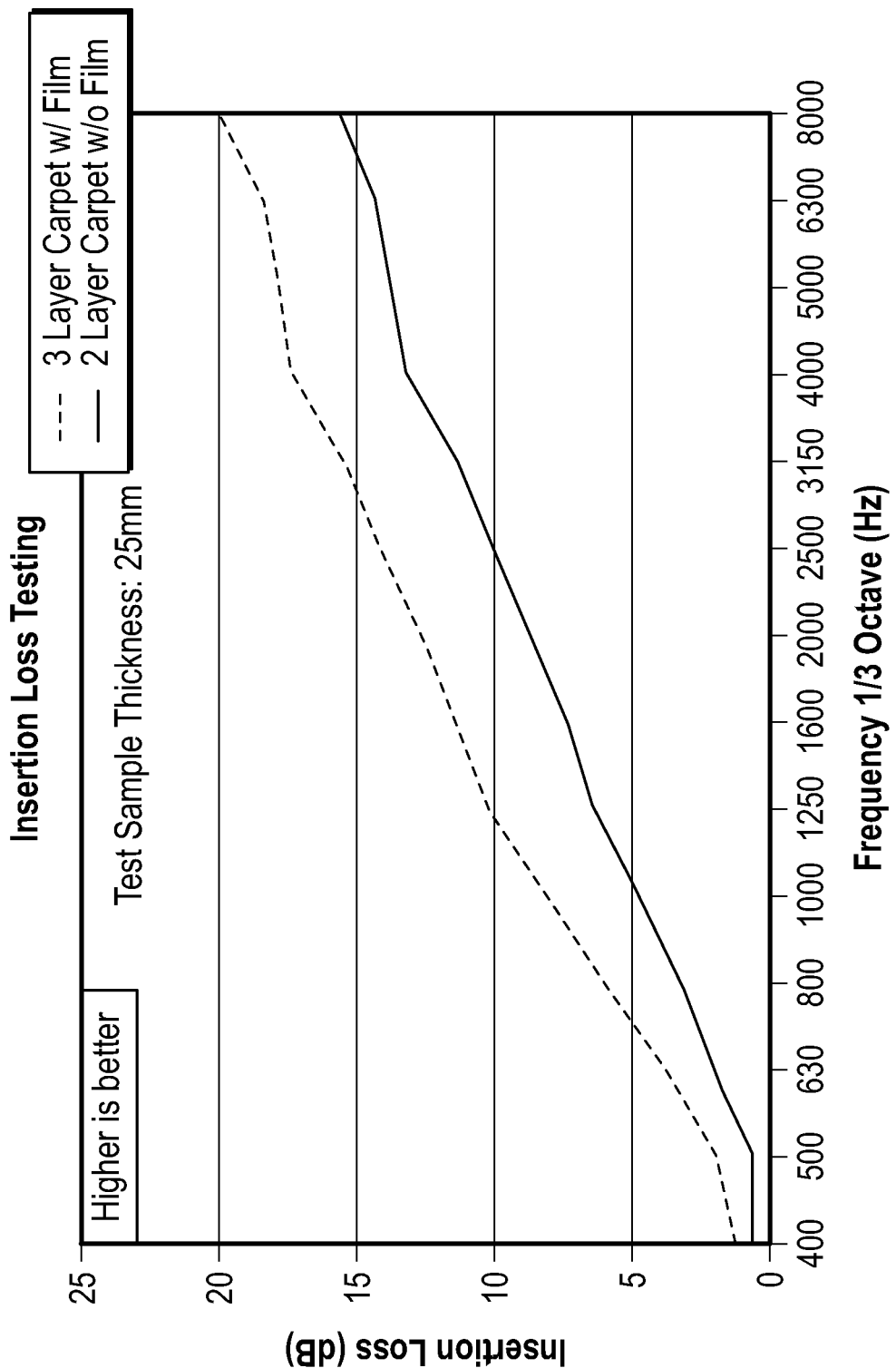
FIG. 4 shows sound insertion loss testing of a 3 layer carpet with film herein versus a 2 layer carpet without film at a thickness of 25 mm.

FIG. 3 shows sound insertion loss testing of a 3 layer carpet with film according to the present invention versus a 2 layer carpet without film at a thickness of 12 mm. FIG. 4 herein now shows insertion loss testing of a 3 layer carpet with film according to the present invention versus a 2 layer carpet without film at a thickness of 25 mm. As can be seen, in both situations, there are higher insertion losses with the 3 layer carpet with film as produced herein.

Figure 5:
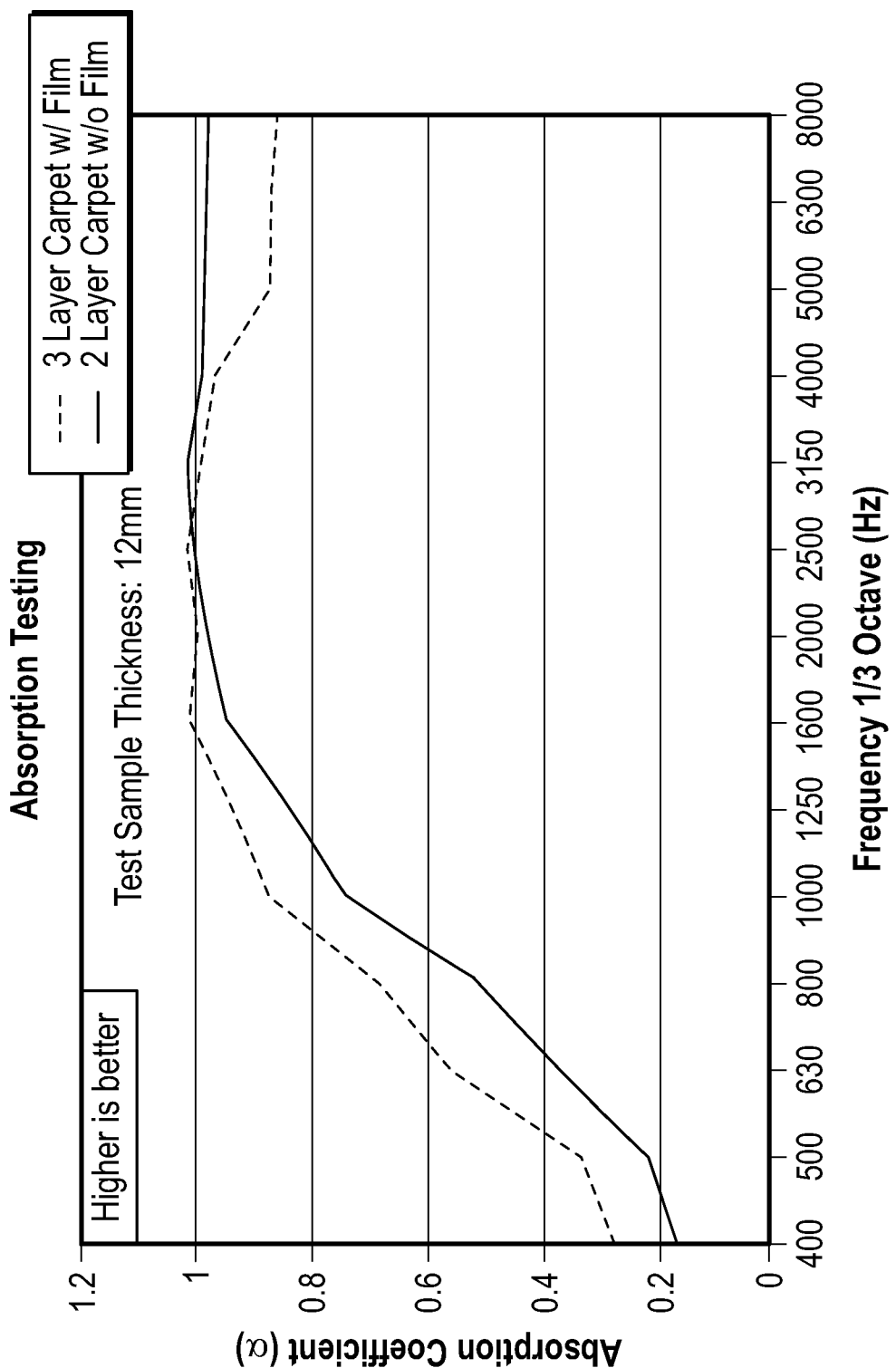
FIG. 5 shows sound absorption testing of a 3 layer carpet with film herein versus a 2 layer carpet without film at a thickness of 12 mm.
Figure 6:
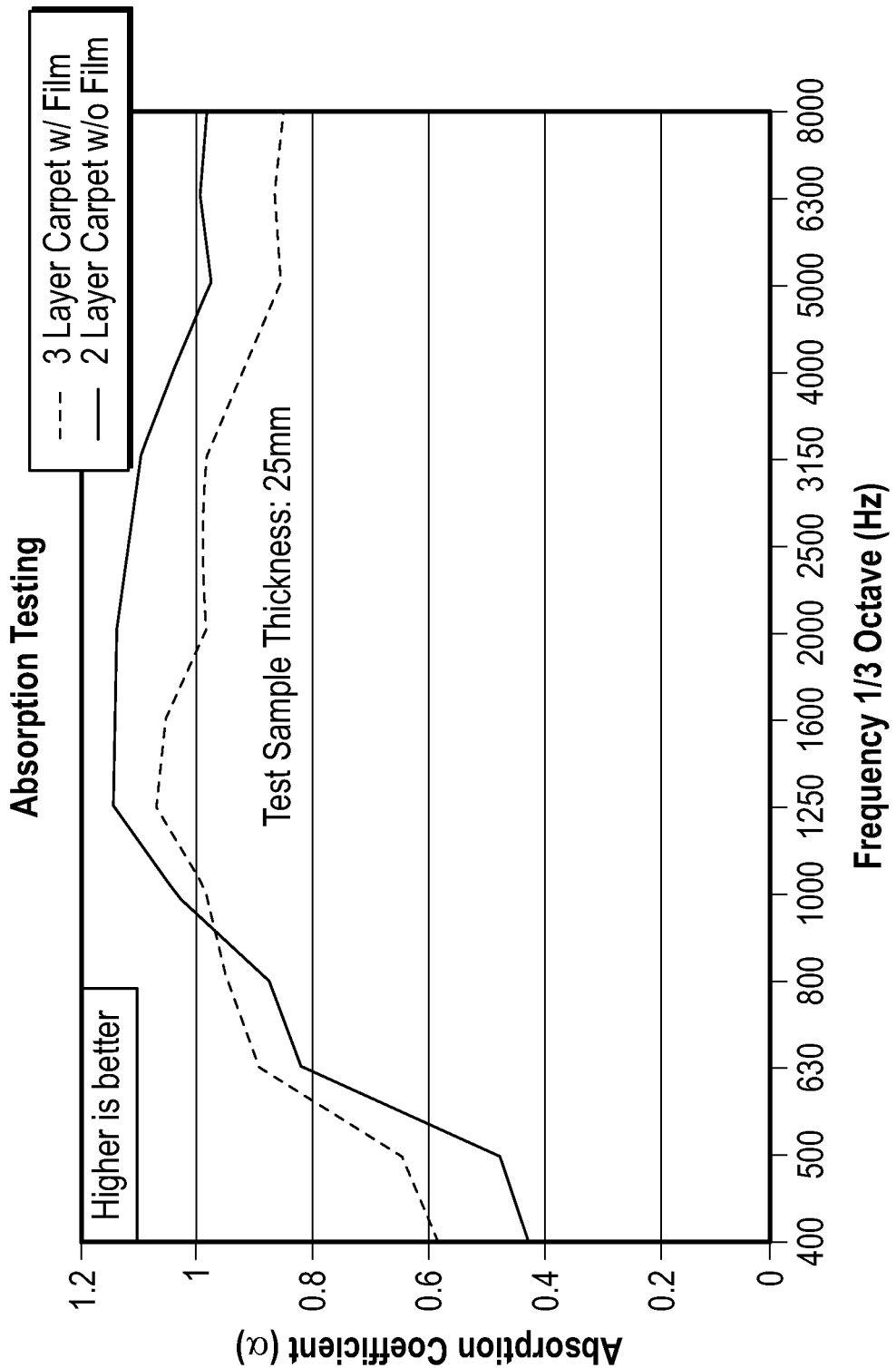
FIG. 6 shows sound absorption testing of a 3 layer carpet with film herein versus a 2 layer carpet without film at a thickness of 25 mm.

FIG. 5 shows sound absorption testing of a 3 layer carpet with film according to the present invention versus a 2 layer carpet without film at a thickness of 12 mm. FIG. 6 shows sound absorption testing of a 3 layer carpet according to the present invention versus a 2 layer carpet without film at a thickness of 25 mm. As can be seen, for the 12 mm sample thickness, the 3 layer carpet shows better absorption at the testing frequency of 400 Hz to about 2500 Hz. With regards to the 25 mm sample, the 3 layer carpet shown better absorption at the testing frequency of 400 Hz to about 1000 Hz. It is worth noting that with respect to both FIGS. 5-6, 400 Hz to 800 Hz is the tire noise range which absorption has relatively high importance to the vehicle occupants.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LISTING OF REFERENCE CHARACTERS

10 Needle punch apparatus
12 Needle loom
14 Needle board
16 Needle board plate
18 Needles
20 Barbs
22 Upward vertical direction
24 Downward vertical direction
26 Needle beam
28 Needle loom driver
30 Stripper plate
32 Stripper plate through holes
36 Bed plate
38 Bed plate through holes
100 Non-woven article
110 Fibrous Substrate
112 Fiber base layer
114 Base layer fibers
120 Intermediate film
122 Film layer
124 Intermediate layer perforation
130 Fibrous cover
132 Fiber top layer
134 Top layer fibers

What is claimed is:

1. A method of forming a multi-layer needled non-woven article, comprising:
    forming a web of a fiber base layer, an intermediate film and a fiber top layer, wherein the intermediate film is disposed between the fiber base layer and the fiber top layer; wherein the intermediate film includes two polyethylene outer layers and a polyamide middle layer disposed between the two polyethylene outer layers;
    needle punching the web with a plurality of needles; and
    wherein, during needle punching, fibers of the fiber base layer are carried by the needles, extended through perforations in the intermediate film formed by the needles and entangled with fibers of the fiber top layer.

2. The method of claim 1, further comprising:
    at least partially closing the perforations in the intermediate film formed by the needles as the needles withdraw therefrom.

3. The method of claim 2, further comprising:
inhibiting at least a portion of the fibers of the fiber base layer extending through the perforations in the intermediate film from returning to the fiber base layer by the at least partial closing of the perforations in the intermediate film formed by the needles.

4. The method of claim 1, wherein the intermediate film has opposite sides; one side of the opposite sides of the intermediate film is in contact with the fiber base layer; and another side of the opposite sides of the intermediate film is in contact with the fiber top layer.

5. The method of claim 1, wherein the fiber base layer has an area weight in a range of 120 grams/square meter to 2,000 grams/square meter; the fiber base layer has a denier in a range of 0.5 denier to 40 denier; and the fiber base layer has fiber lengths in a range of 10 mm to 100 mm.

6. The method of claim 1, wherein the fibers of the fiber base layer are formed of thermoplastic.

7. The method of claim 1, wherein the fibers of the fiber base layer comprise staple fibers and binder fibers.

8. The method of claim 1, wherein the fiber base layer is a felt layer.

9. The method of claim 1, wherein the intermediate film has an area weight in a range of 10 grams/square meter to 900 grams/square meter; and the intermediate film has a thickness in a range of 0.0125 mm to 1 mm.

10. The method of claim 1, wherein the fiber top layer has an area weight in a range of 120 grams/square meter to 1,200 grams/square meter; the fiber top layer has a denier in a range of 0.5 denier to 40 denier; and the fiber top layer has fiber lengths in a range of 10 mm to 100 mm.

11. The method of claim 1, wherein the fibers of the fiber top layer are formed of thermoplastic.

12. The method of claim 1, wherein the fibers of the fiber top layer comprise staple fibers and binder fibers.

13. The method of claim 1, wherein the fiber top layer is flat, or is structured with a random velour, loop pattern or random fiber pattern.

* * * * *